(12) United States Patent
Zhang et al.

(10) Patent No.: US 10,530,102 B2
(45) Date of Patent: Jan. 7, 2020

(54) POWER ADAPTER, SOCKET, AND ASSEMBLY

(71) Applicant: HUAWEI TECHNOLOGIES CO., LTD., Shenzhen (CN)

(72) Inventors: Ke Zhang, Shenzhen (CN); Shengyou Cai, Shenzhen (CN); Yishi Deng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/064,461

(22) PCT Filed: Dec. 21, 2015

(86) PCT No.: PCT/CN2015/098049
§ 371 (c)(1),
(2) Date: Jun. 21, 2018

(87) PCT Pub. No.: WO2017/107003
PCT Pub. Date: Jun. 29, 2017

(65) Prior Publication Data
US 2019/0013629 A1 Jan. 10, 2019

(51) Int. Cl.
*H01R 13/66* (2006.01)
*H01R 27/00* (2006.01)
*H04B 3/54* (2006.01)

(52) U.S. Cl.
CPC ..... *H01R 13/6691* (2013.01); *H01R 13/6675* (2013.01); *H01R 27/00* (2013.01); *H04B 3/54* (2013.01); *H04B 2203/5454* (2013.01)

(58) Field of Classification Search
CPC ............ H01R 13/6691; H01R 13/6675; H01R 27/00; H01R 31/065; H01R 2201/04; H04B 3/54; H04B 2203/5454; H04B 3/56
(Continued)

(56) References Cited

U.S. PATENT DOCUMENTS 4,451,108 A * 5/1984 Skidmore .............. H02G 3/126
439/536
5,033,112 A 7/1991 Bowling et al.
(Continued)

FOREIGN PATENT DOCUMENTS

CN 102341990 A 2/2012
CN 104078791 A 10/2014
(Continued)

*Primary Examiner* — Juan A Torres
(74) *Attorney, Agent, or Firm* — Kilpatrick Townsend & Stockton LLP

(57) ABSTRACT

Embodiments of the present invention disclose a power adapter. One end of the power adapter is configured to connect to a power supply apparatus, and the other end of the power adapter is configured to connect to a network terminal device. The power adapter includes a power module, a communication module, and a connection module. The power module is connected to both the communication module and the connection module, and is configured to obtain electric energy from the power supply apparatus, and supply power to the communication module and the connection module. The communication module is connected to the connection module, and is configured to communicate with the network terminal device by using the connection module. The connection module is configured to connect to the network terminal device, and transmit a signal between the communication module and the network terminal device.

15 Claims, 9 Drawing Sheets

(58) Field of Classification Search
USPC .......................................................... 375/257
See application file for complete search history.

(56) References Cited

U.S. PATENT DOCUMENTS

| | | | |
|---|---|---|---|
| 6,246,600 B1 | 6/2001 | Thandiwe | |
| 7,399,205 B2 * | 7/2008 | McNeely | A61B 5/0006 |
| | | | 439/577 |
| 8,908,673 B2 * | 12/2014 | Binder | H04B 3/54 |
| | | | 370/351 |
| 2003/0185027 A1 | 10/2003 | Yokoo et al. | |
| 2008/0050971 A1 | 2/2008 | Saito | |
| 2012/0092141 A1 | 4/2012 | Ichihara et al. | |
| 2013/0268433 A1 | 10/2013 | Viner et al. | |

FOREIGN PATENT DOCUMENTS

| | | |
|---|---|---|
| CN | 203871609 U | 10/2014 |
| CN | 203967337 U | 11/2014 |
| GB | 2426677 A | 11/2006 |
| JP | 2003283389 A | 10/2003 |
| JP | 2003298477 A | 10/2003 |
| JP | 2006148593 A | 6/2006 |
| JP | 2010198994 A | 9/2010 |

* cited by examiner

POWER ADAPTER, SOCKET, AND ASSEMBLY

CROSS-REFERENCE TO RELATED APPLICATIONS

This application is a National Stage of International Application No. PCT/CN2015/098049, filed on Dec. 21, 2015, which is hereby incorporated by reference in its entirety.

TECHNICAL FIELD

The present invention relates to the field of communications technologies, and specifically, to a power adapter, a socket, and an assembly.

BACKGROUND

With the development of electronic technologies, power adapters are widely used together with network terminal devices, such as twin handset phones, game consoles, language repeaters, Walkmans, notebook computers, and cellular phones. A power adapter is generally configured to supply power to a network terminal device.

As shown in FIG. 1, FIG. 1 is a power line communication (English full name: Power Line Communication, PLC for short) networking diagram. It can be seen that a power adapter and a power line communication modem each occupy one mains socket. Power supplies distributed from a municipal power grid to each electronic terminal are collectively referred to as mains supplies. A voltage of the mains socket is usually a single-phase 220 V voltage or a three-phase 380 V voltage. A PLC terminal (that is, the power line communication modem) is connected to a router by using a network cable, and the power adapter is connected to the router by using a power cable. On the router, interfaces are provided for connecting to the power line communication modem and to the power adapter.

It can be learned that, at least two mains sockets and two cables are required when a power adapter and a PLC terminal are used at the same time. This wastes space and resources, thereby affecting home environments.

SUMMARY

The present invention is intended to provide a power adapter, a socket, and an assembly, to overcome a disadvantage in the prior art that a power adapter and a PLC terminal cannot be integrated, so as to effectively save resources and space.

A first aspect of the present invention provides a power adapter, where one end of the power adapter is configured to connect to a power supply apparatus, and the other end of the power adapter is configured to connect to a network terminal device; and the power adapter includes:

a power module, a communication module, and a connection module, where the power module is connected to both the communication module and the connection module, and is configured to obtain electric energy from the power supply apparatus, and supply power to the communication module and the connection module;

the communication module is connected to the connection module, and is configured to communicate with the network terminal device by using the connection module; and the connection module is configured to connect to the network terminal device, and transmit a signal between the communication module and the network terminal device.

It should be noted that, the power module, the communication module, and the connection module are generally connected to each other by using a bus. No specific limitation is imposed herein.

Different from the prior art, in the present invention, the power adapter includes the communication module, and the communication module communicates with the network terminal device by using the connection module, making the power adapter more intelligent. For example, a user can access a network by using a power line directly by connecting the power adapter to a router, without a need to connect to the network by using a PLC terminal. For the user, the user can obtain efficient communication benefits without perception.

With reference to the first aspect, in some possible implementations, the connection module includes a first terminal group, a second terminal group, and a third terminal, where the first terminal group is configured to connect to a first jack group in the network terminal device, and transmit, to the network terminal device, a first signal sent by the communication module, and the first terminal group includes at least one first terminal;

the second terminal group is configured to connect to a second jack group in the network terminal device, and transmit, to the communication module, a second signal sent by the network terminal device, and the second terminal group includes at least one second terminal; and the third terminal is configured to connect to a third jack in the network terminal device, and transmit the electric energy of the power module to the network terminal device.

It can be learned that the connection module includes three types of terminals. The first terminal transmits, to the network terminal device, the first signal sent by the communication module. The second terminal transmits, to the communication module, the second signal sent by the network terminal device. The third terminal transmits the electric energy of the power module to the network terminal device. It can be learned that, each type of terminal implements its own function, and no signal interference is generated. In addition, the first terminal may send a signal at the same time as the second terminal receives a signal, thereby effectively improving signal transmission efficiency. It should be noted that, the first signal and the second signal are mainly Internet Protocol (English full name: Internet Protocol, IP for short) packet data signals, and no specific limitation is imposed herein.

In some other possible implementations, the connection module includes:

a fourth terminal group and a fifth terminal, where the fourth terminal group is configured to connect to a fourth jack group in the network terminal device, and transmit, to the network terminal device, a first signal sent by the communication module and/or transmit, to the communication module, a second signal sent by the network terminal device, and the fourth terminal group includes at least one fourth terminal; and the fifth terminal is configured to connect to a fifth jack in the network terminal device, and transmit the electric energy of the power module to the network terminal device.

It can be learned that the connection module includes two types of terminals. The fourth terminal transmits, to the network terminal device, the first signal sent by the communication module and/or transmits, to the communication module, the second signal sent by the network terminal device. The fifth terminal transmits the electric energy of the power module to the network terminal device. It can be learned that, the fourth terminal has both a signal sending function and a signal receiving function, thereby effectively saving space resources for the power adapter.

In some other possible implementations, the connection module includes:

a sixth terminal, where the sixth terminal is configured to connect to a sixth jack in the network terminal device, and transmit, to the network terminal device, a first signal sent by the communication module and/or transmit, to the communication module, a second signal sent by the network terminal device; and the sixth terminal is further configured to transmit the electric energy of the power module to the network terminal device.

It can be learned that the connection module includes the sixth terminal. The sixth terminal transmits, to the network terminal device, the first signal sent by the communication module and/or transmits, to the communication module, the second signal sent by the network terminal device. The sixth terminal is further configured to transmit the electric energy of the power module to the network terminal device. It can be learned that, the sixth terminal integrates multiple functions, thereby effectively saving space resources for the power adapter.

A second aspect of the present invention provides a socket used together with a power adapter, where the power adapter includes a power module, a communication module, and a connection module, the power adapter is configured to connect to a network terminal device, and the socket is applied to the network terminal device; and the socket includes:

a first jack group, a second jack group, and a third jack, where the first jack group is configured to connect to a first terminal group in the connection module, and transmit, to the network terminal device, a first signal sent by the communication module, and the first jack group includes at least one first jack; the second jack group is configured to connect to a second terminal group in the connection module, and transmit, to the communication module, a second signal sent by the network terminal device, and the second jack group includes at least one second jack; and the third jack is configured to connect to a third terminal in the connection module, and transmit electric energy of the power module to the network terminal device.

It can be learned that the socket includes three types of jacks. The first jack transmits, to the network terminal device, the first signal sent by the communication module. The second jack transmits, to the communication module, the second signal sent by the network terminal device. The third jack transmits the electric energy of the power module to the network terminal device. It can be learned that, each type of jack implements its own function, and no signal interference is generated. In addition, the first jack may send a signal at the same time as the second jack receives a signal, thereby effectively improving signal transmission efficiency. It should be noted that, the first signal and the second signal are mainly IP packet data signals, and no specific limitation is imposed herein.

Alternatively, the socket includes a fourth jack group and a fifth jack, where the fourth jack group is configured to connect to a fourth terminal group in the connection module, and transmit, to the network terminal device, a first signal sent by the communication module and/or transmit, to the communication module, a second signal sent by the network terminal device, and the fourth jack group includes at least one fourth jack; and the fifth jack group is configured to connect to a fifth terminal in the connection module, and transmit electric energy of the power module to the network terminal device.

It can be learned that the socket includes two types of jacks. The fourth jack transmits, to the network terminal device, the first signal sent by the communication module and/or transmits, to the communication module, the second signal sent by the network terminal device. The fifth jack transmits the electric energy of the power module to the network terminal device. It can be learned that, the fourth jack has both a signal sending function and a signal receiving function, thereby effectively saving space resources for the power adapter.

Alternatively, the socket includes a sixth jack, where the sixth jack is configured to connect to a sixth terminal in the connection module, and transmit, to the network terminal device, a first signal sent by the communication module and/or transmit, to the communication module, a second signal sent by the network terminal device; and the sixth jack is further configured to transmit electric energy of the power module to the network terminal device.

It can be learned that the socket includes one type of jack. The sixth jack transmits, to the network terminal device, the first signal sent by the communication module and/or transmits, to the communication module, the second signal sent by the network terminal device. The sixth jack is further configured to transmit the electric energy of the power module to the network terminal device. It can be learned that, the sixth jack integrates multiple functions, thereby effectively saving space resources for the power adapter.

A third aspect of the present invention provides a power adapter assembly, including:

a power adapter and a socket, where the power adapter is the power adapter according to any one of the first aspect or the possible implementations of the first aspect; and the socket is the socket according to the second aspect.

It can be learned that, the power adapter and the socket are used together; the power adapter integrates dual functions of power supply and communication, and the socket and the power adapter are connected for use, thereby effectively saving space resources for the power adapter and making the power adapter more intelligent. For example, a user can access a network by using a power line directly by connecting the power adapter to a router, without a need to connect to the network by using a PLC terminal. For the user, the user can obtain efficient communication benefits without perception.

DESCRIPTION OF EMBODIMENTS

The present invention is intended to provide a power adapter, a socket, and an assembly, to overcome a disadvantage in the prior art that a power adapter and a PLC terminal cannot be integrated, so as to effectively save resources and space.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

In the specification, claims, and accompanying drawings of the present invention, the terms "first", "second", "third", "fourth", and the like are intended to distinguish between different objects but do not indicate a particular order. In addition, the terms "including", "comprising", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Figure 1:
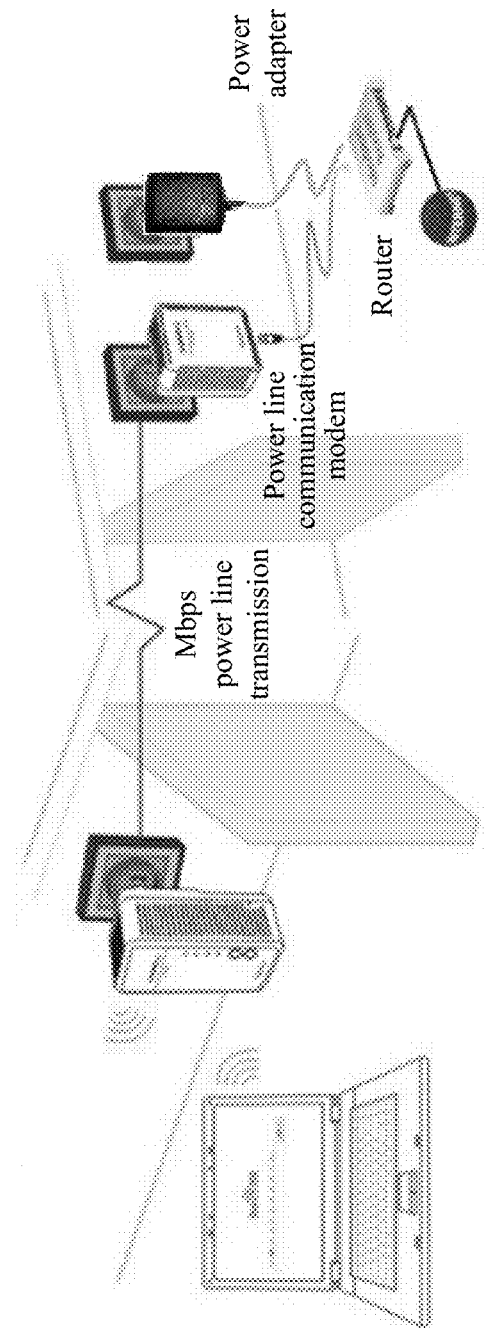
FIG. 1 is a schematic structural diagram of a PLC network in the prior art.
Figure 2:
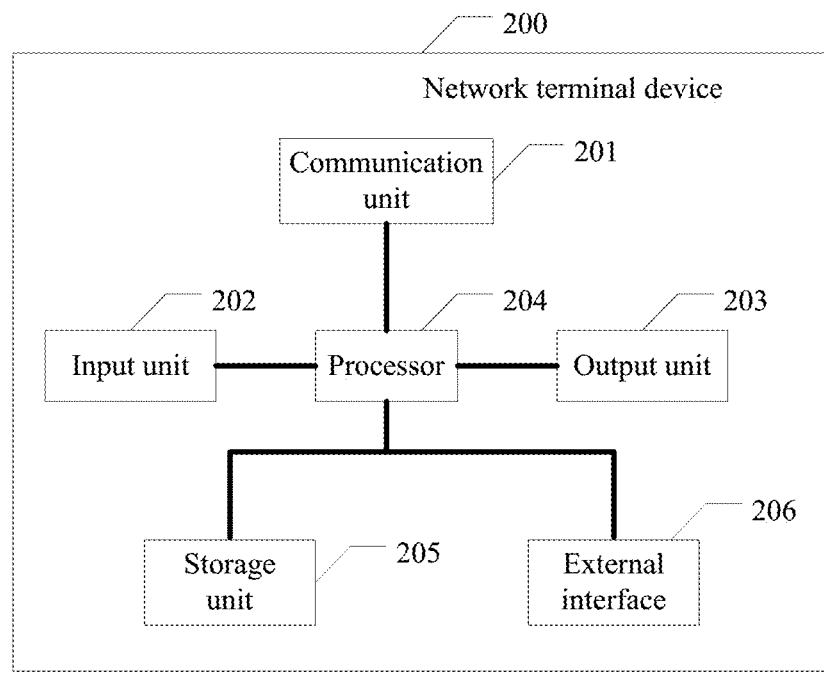
FIG. 2 is a schematic structural diagram of a terminal device matching a power adapter according to an embodiment of the present invention.

The power adapter in the present invention is applied to any network terminal device. As shown in FIG. 2, a network terminal device 200 includes a communication unit 201, an input unit 202, an output unit 203, a processor 204, a storage unit 205, and an external interface 206. The units are connected to each other by using one or more buses. The communication unit 201 is configured to establish a communication channel, so that the network terminal device performs voice communication, text communication, and data communication, and the like with a remote electronic device or server by using the communication channel. The input unit 202 is configured to implement interaction between a user and the network terminal device and/or input information to the terminal device. The processor 204 is a control center of the network terminal device, and uses various interfaces and lines to connect to all parts of the entire terminal device. The processor 204 implements functions of the terminal device and/or data processing by running or executing a software program and/or a module stored in the storage unit and by invoking data stored in the storage unit. The output unit 203 includes but not limited to a sound output unit, which is configured to convert an audio signal output by the processor from a digital format to an analog format. The storage unit 205 may be configured to store the software program and the module. The external interface 206 is configured to connect to the remote electronic device or server.

A person skilled in the art may understand that, a structure of the network terminal device shown in FIG. 2 does not constitute a limitation to the present invention. The network terminal device may be of a bus structure or may be of a star structure, and may further include more or fewer components than those shown in the figure, or a combination of some components, or components disposed differently. A network terminal device in implementations of the present invention includes but not limited to a mobile phone, a mobile computer, a tablet computer, a personal digital assistant (English full name: Personal Digital Assistant, PDA for short), a media player, a smart TV, a wearable device (for example, a smartwatch or a pair of smart glasses), a combination of two or more thereof, and the like.

Figure 3A:
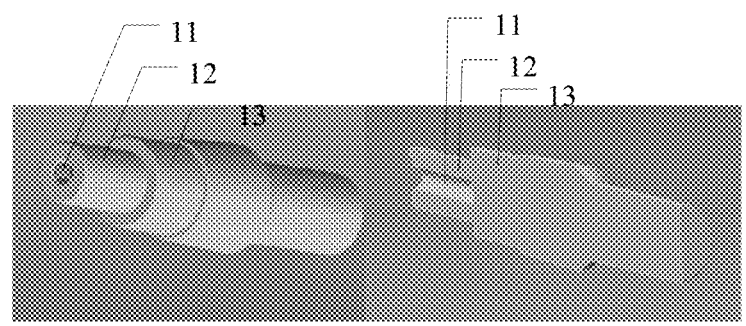
FIG. 3a is a schematic structural diagram of a connection module of a power adapter in the prior art.
Figure 3B:
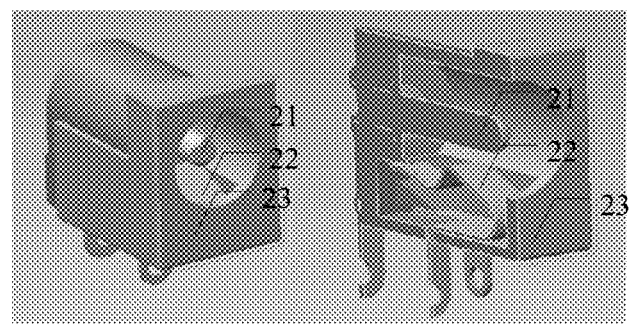
FIG. 3b is a schematic structural diagram of a socket in the prior art.
Figure 3C:
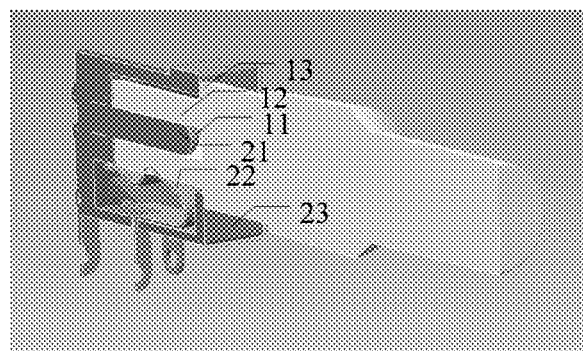
FIG. 3c is a schematic structural diagram illustrating that a power adapter and a socket are used together in the prior art.
Figure 3D:
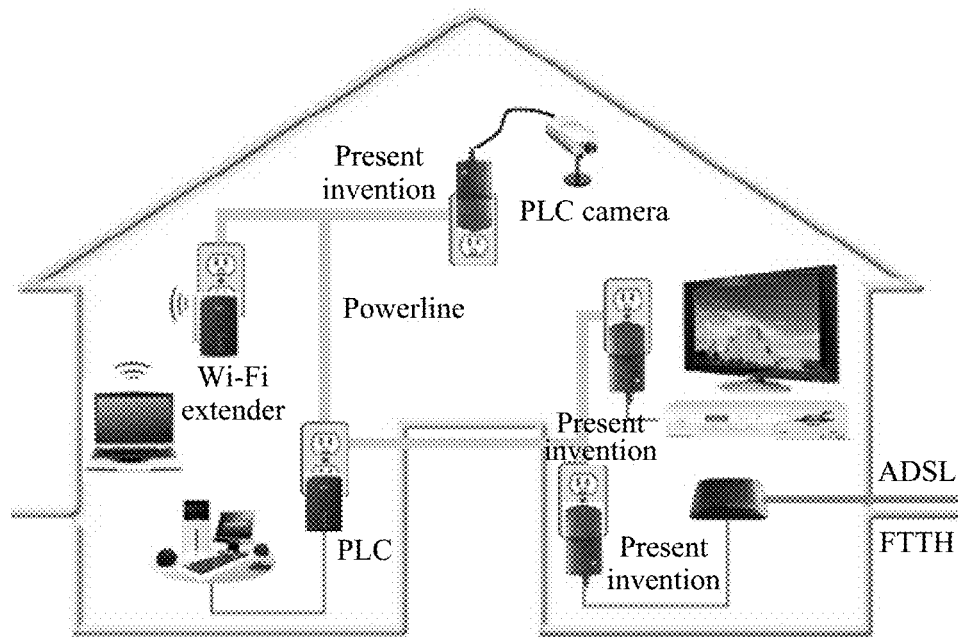
FIG. 3d is a schematic structural diagram of a PLC network according to an embodiment of the present invention.

Before the embodiments of the present invention are described, an application scenario of the present invention is described as follows: Generally, a power adapter is only configured to supply power to a network terminal device. The power adapter is connected to the network terminal device by using a connection module (that is, a terminal for connecting to a socket, or referred to as a plug) in the power adapter, and provides electric energy for the network terminal device. As shown in FIG. 3a, FIG. 3a shows a side view and a sectional view of a connection module (that is, a terminal for connecting to a socket, or referred to as a plug) in the prior art. The connection module includes a plug-hole electrode 11 (a positive electrode), a sliding spring sheet 12 (a negative electrode), and an insulation appearance 13. The connection module of the power adapter is inserted into the socket in the network terminal device, to provide the electric energy for the network terminal device. As shown in FIG. 3b, FIG. 3b shows a side view and a sectional view of the socket used together with the connection module in the prior art. The socket includes a center electrode 21 (a positive electrode), a jack spring sheet 22 (a negative electrode), and an insulation appearance 23. As shown in FIG. 3c, FIG. 3c shows a sectional view illustrating that the connection module shown in FIG. 3a is used together with the socket shown in FIG. 3b. It can be learned that, when the power adapter and the socket are used together, the power adapter has only a power supply function and does not have a communication function. To overcome a disadvantage in the prior art, a design concept of the present invention is as follows: As shown in FIG. 3d, according to a solution in the present invention, a communication module is integrated into the power adapter, and by using a composite power-supply electrode on a center channel, the power adapter implements a communication function while supplying power to the network terminal device.

Figure 4:
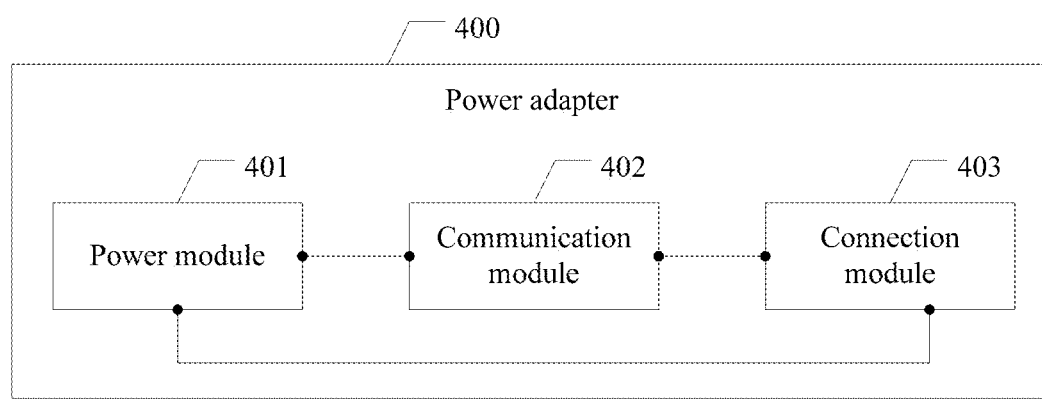
FIG. 4 is a schematic structural diagram of a power adapter according to an embodiment of the present invention.

Referring to FIG. 4, FIG. 4 is a schematic structural diagram of a power adapter 400 according to an embodiment of the present invention. One end of the power adapter 400 is configured to connect to a power supply apparatus, and the other end of the power adapter 400 is configured to connect to a network terminal device. The power adapter 400 includes a power module 401, a communication module 402, and a connection module 403.

The power module 401 is connected to both the communication module 402 and the connection module 403, and is configured to obtain electric energy from the power supply apparatus, and supply power to the communication module 402 and the connection module 403.

The communication module 402 is connected to the connection module 403, and is configured to communicate with the network terminal device by using the connection module 403.

The connection module 403 is configured to connect to the network terminal device, and transmit a signal between the communication module 402 and the network terminal device.

It can be learned that, different from the prior art, in the present invention, the power adapter includes the communication module, and the communication module communicates with the network terminal device by using the connection module, making the power adapter more intelligent. For example, a user can access a network directly by connecting the power adapter to a router, without a need to connect to the network by using a PLC terminal. For the user, the user can obtain efficient communication benefits without perception.

In some possible implementations, the communication module 402 is further configured to run a software control program, and the software control program is used to assist the communication module 402 in communicating with the network terminal device.

Figure 5A:
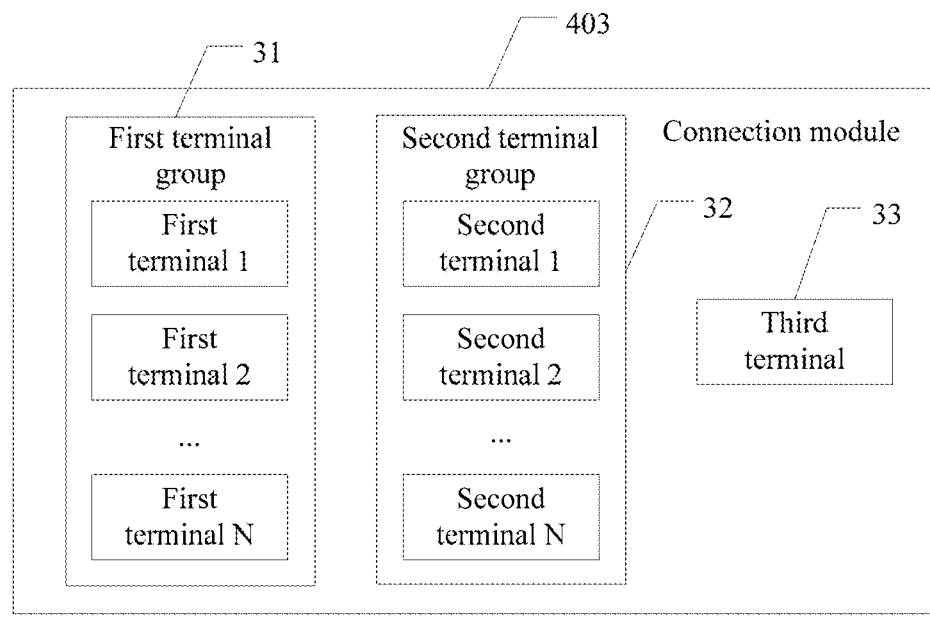
FIG. 5a to FIG. 5d are schematic structural diagrams of a connection module of a power adapter according to an embodiment of the present invention.

In some possible implementations, as shown in FIG. 5a, the connection module 403 includes a first terminal group 31, a second terminal group 32, and a third terminal 33, where the first terminal group 31 is configured to connect to a first jack group in the network terminal device, and transmit, to the network terminal device, a first signal sent by the communication module, and the first terminal group 31 includes at least one first terminal (which is, as shown in FIG. 5a, a first terminal 1, a first terminal 2, . . . , a first terminal N, where N is an integer greater than 1);

the second terminal group 32 is configured to connect to a second jack group in the network terminal device, and transmit, to the communication module, a second signal sent by the network terminal device, and the second terminal group 32 includes at least one second terminal (which is, as shown in FIG. 5a, a second terminal 1, a second terminal 2, . . . , a second terminal N, where N is an integer greater than 1); and the third terminal 33 is configured to connect to a third jack in the network terminal device, and transmit the electric energy of the power module to the network terminal device.

It should be noted that, the first terminal, the second terminal, and the third terminal may be pin-shaped, sheet-like, or pillar-shaped, or may be in another shape. No specific limitation is imposed herein.

Figure 5B:
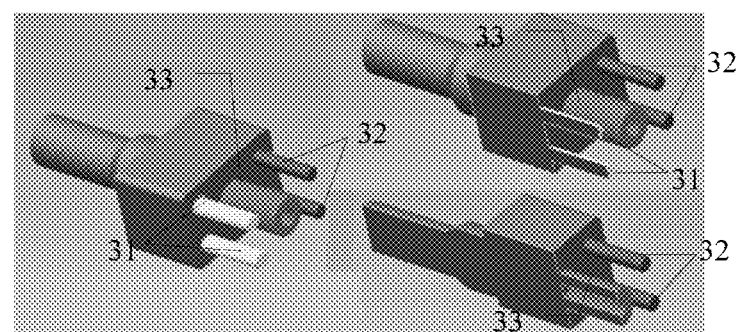

In actual application, as shown in FIG. 5b, the connection module includes three types of terminals. The first terminal transmits, to the network terminal device, the first signal sent by the communication module. There is at least one first terminal, and the first terminal is generally made of a metal material plated with bronze/brass, copper-titanium alloy, or silver and has low costs. The second terminal transmits, to the communication module, the second signal sent by the network terminal device. There is at least one second terminal, and the second terminal is generally made of the metal material plated with bronze/brass, copper-titanium alloy, or silver and has low costs. The third terminal 33 transmits the electric energy of the power module to the network terminal device. It can be learned that, each type of terminal implements its own function, and no signal interference is generated. In addition, the first terminal may send a signal at the same time as the second terminal receives a signal, thereby effectively improving signal transmission efficiency. It should be noted that, the first signal and the second signal are mainly IP packet data signals, and no specific limitation is imposed herein.

Figure 5C:
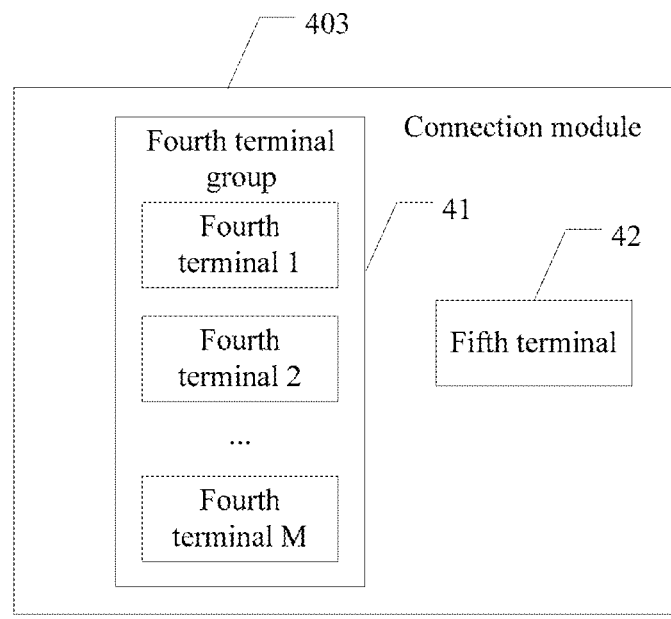

In some other possible implementations, as shown in FIG. 5c, the connection module 403 includes:

a fourth terminal group 41 and a fifth terminal 42, where the fourth terminal group 41 is configured to connect to a fourth jack group in the network terminal device, and transmit, to the network terminal device, a first signal sent by the communication module and/or transmit, to the communication module, a second signal sent by the network terminal device, and the fourth terminal group includes at least one fourth terminal (which is, as shown in FIG. 5c, a fourth terminal 1, a fourth terminal 2, . . . , a fourth terminal M, where M is an integer greater than 1); and the fifth terminal 42 is configured to connect to a fifth jack in the network terminal device, and transmit the electric energy of the power module to the network terminal device.

It should be noted that, the fourth terminal and the fifth terminal may be pin-shaped, sheet-like, or pillar-shaped, or may be in another shape. No specific limitation is imposed herein.

It can be learned that the connection module 403 includes two types of terminals. The fourth terminal transmits, to the network terminal device, the first signal sent by the communication module and/or transmits, to the communication module, the second signal sent by the network terminal device. The fifth terminal transmits the electric energy of the power module to the network terminal device. It can be learned that, the fourth terminal has both a signal sending function and a signal receiving function, thereby effectively saving space resources for the power adapter.

Figure 5D:
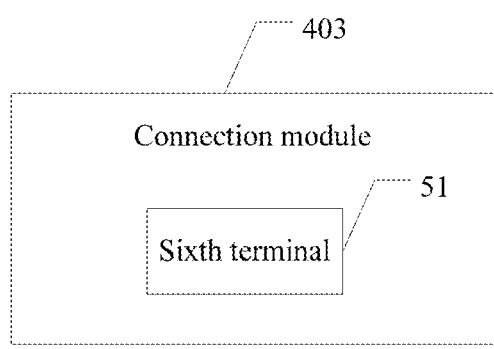

In some other possible implementations, as shown in FIG. 5d, the connection module 403 includes:

a sixth terminal 51, where the sixth terminal 51 is configured to connect to a sixth jack in the network terminal device, and transmit, to the network terminal device, a first signal sent by the communication module and/or transmit, to the communication module, a second signal sent by the network terminal device; and the sixth terminal 51 is further configured to transmit the electric energy of the power module to the network terminal device.

It should be noted that, the sixth terminal may be pin-shaped, sheet-like, or pillar-shaped, or may be in another shape. No specific limitation is imposed herein.

It can be learned that the connection module 403 includes the sixth terminal. The sixth terminal transmits, to the network terminal device, the first signal sent by the communication module and/or transmits, to the communication module, the second signal sent by the network terminal device. The sixth terminal is further configured to transmit the electric energy of the power module to the network terminal device. It can be learned that, the sixth terminal integrates multiple functions, thereby effectively saving space resources for the power adapter.

Figure 6A:
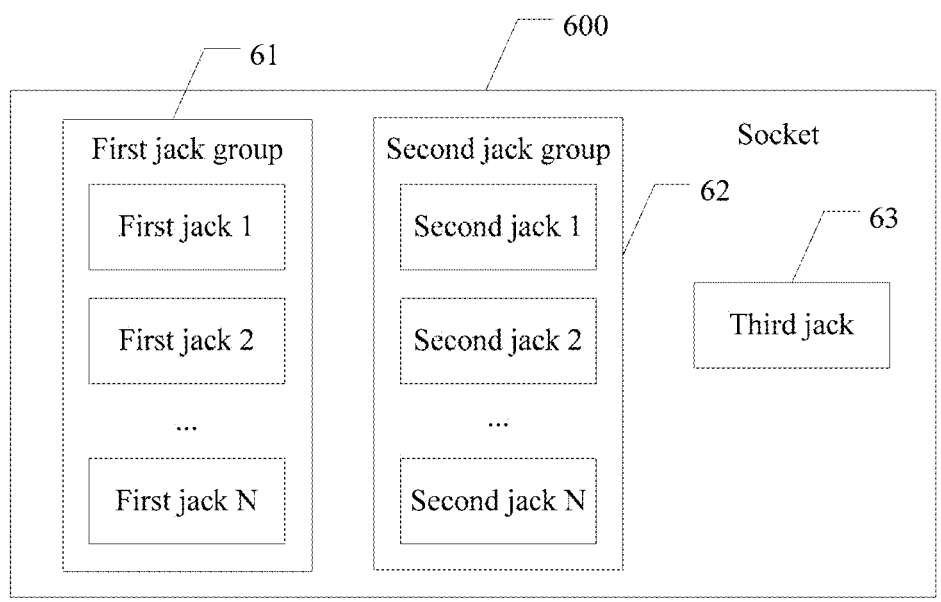
FIG. 6a to FIG. 6d are schematic structural diagrams of a socket according to an embodiment of the present invention.

Referring to FIG. 6a, FIG. 6a is a schematic structural diagram of a socket 600 used together with a power adapter according to an embodiment of the present invention. The power adapter includes a power module, a communication module, and a connection module, and the power adapter is configured to connect to a network terminal device. The socket is applied to the network terminal device, and the socket 600 includes:

a first jack group 61, a second jack group 62, and a third jack 63, where the first jack group 61 is configured to connect to a first terminal group in the connection module, and transmit, to the network terminal device, a first signal sent by the communication module, and the first jack group 61 includes at least one first jack (which is, as shown in FIG. 6*a*, a first jack 1, a first jack 2, . . . , a first jack N, where N is a positive integer greater than 1); the second jack group 62 is configured to connect to a second terminal group in the connection module, and transmit, to the communication module, a second signal sent by the network terminal device, and the second jack group 62 includes at least one second jack (which is, as shown in FIG. 6*a*, a second jack 1, a second jack 2, . . . , a second jack N, where N is a positive integer greater than 1); and the third jack 63 is configured to connect to a third terminal in the connection module, and transmit electric energy of the power module to the network terminal device.

Figure 6B:
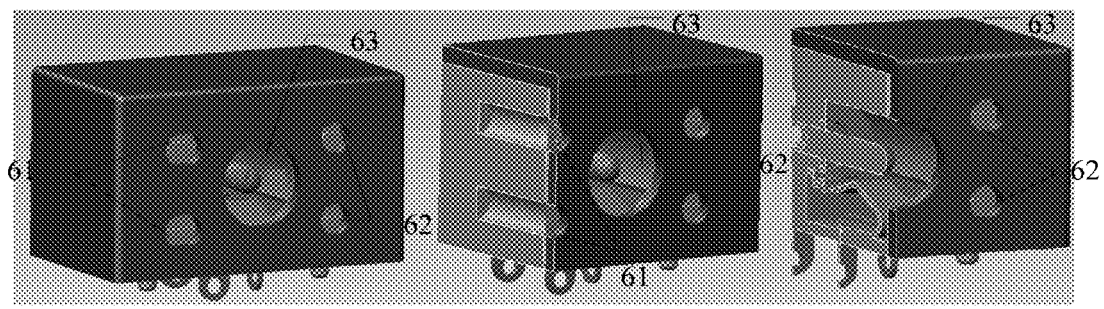

In actual application, as shown in FIG. 6*b*, it can be learned that the socket includes three types of jacks. The first jack transmits, to the network terminal device, the first signal sent by the communication module. There is at least one first jack, and the first jack is made of a metal material plated with bronze/brass, copper-titanium alloy, or silver, and the like and has relatively low costs. The second jack transmits, to the communication module, the second signal sent by the network terminal device. There is at least one second jack, and the second jack is made of the metal material plated with bronze/brass, copper-titanium alloy, or silver, and the like and has relatively low costs. The third jack 63 transmits the electric energy of the power module to the network terminal device. It can be learned that, each type of jack implements its own function, and no signal interference is generated. In addition, the first jack may send a signal at the same time as the second jack receives a signal, thereby effectively improving signal transmission efficiency. It should be noted that, the first signal and the second signal are mainly IP packet data signals, and no specific limitation is imposed herein.

Figure 6C:
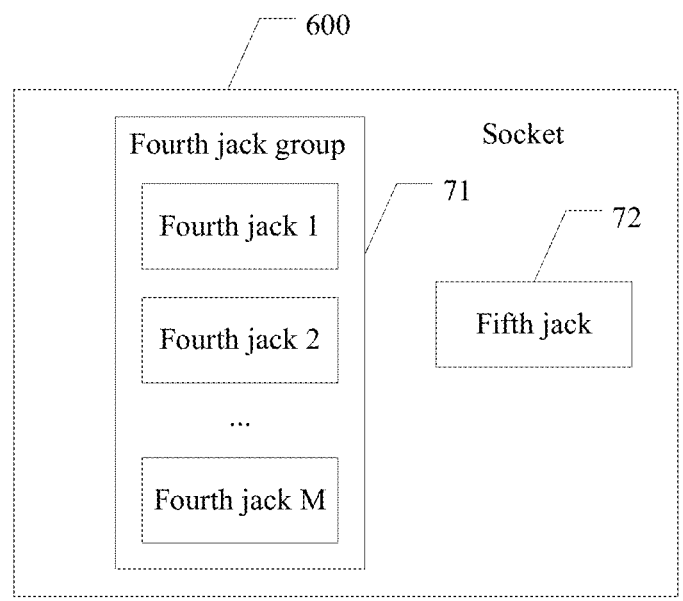

Alternatively, as shown in FIG. 6*c*, the socket 600 includes a fourth jack group 71 and a fifth jack 72, where the fourth jack group 71 is configured to connect to fourth terminal group 41 in the connection module, and transmit, to the network terminal device, a first signal sent by the communication module and/or transmit, to the communication module, a second signal sent by the network terminal device, and the fourth jack group 71 includes at least one fourth jack (which is, as shown in FIG. 6*c*, a fourth jack 1, a fourth jack 2, . . . , a fourth jack M, where M is a positive integer greater than 1); and the fifth jack 72 is configured to connect to a fifth terminal in the connection module, and transmit electric energy of the power module to the network terminal device.

It can be learned that the socket includes two types of jacks. The fourth jack transmits, to the network terminal device, the first signal sent by the communication module and/or transmits, to the communication module, the second signal sent by the network terminal device. The fifth jack transmits the electric energy of the power module to the network terminal device. It can be learned that, the fourth jack has both a signal sending function and a signal receiving function, thereby effectively saving space resources for the power adapter.

Figure 6D:
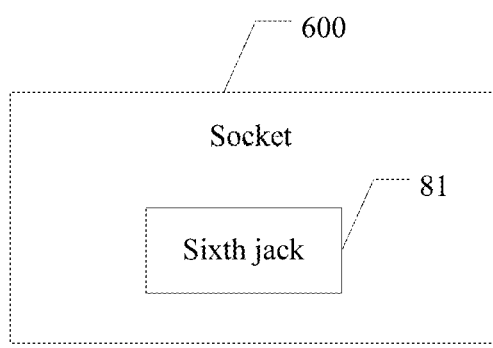

Alternatively, as shown in FIG. 6*d*, the socket 600 includes a sixth jack 81, where the sixth jack 81 is configured to connect to a sixth terminal in the connection module, and transmit, to the network terminal device, a first signal sent by the communication module and/or transmit, to the communication module, a second signal sent by the network terminal device; and the sixth jack 81 is further configured to transmit electric energy of the power module to the network terminal device.

It can be learned that the socket includes one type of jack. The sixth jack transmits, to the network terminal device, the first signal sent by the communication module and/or transmits, to the communication module, the second signal sent by the network terminal device. The sixth jack is further configured to transmit the electric energy of the power module to the network terminal device. It can be learned that, the sixth jack integrates multiple functions, thereby effectively saving space resources for the power adapter.

It should be noted that, any type of socket shown in FIG. 6*a* to FIG. 6*d* is not only used together with a connection module of any type of power adapter shown in FIG. 4 or FIG. 5*a* to FIG. 5*d* to implement both a network access function and power supply, but also used together with a connection module of some power adapters in the prior art. No specific limitation is imposed herein.

Figure 7:
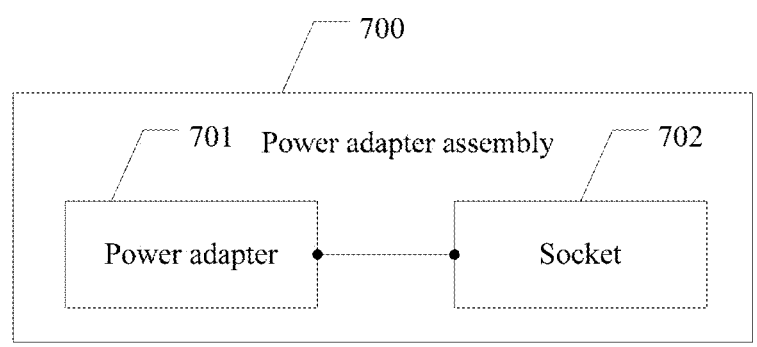
FIG. 7 is a schematic structural diagram of a power adapter assembly according to an embodiment of the present invention.

Referring to FIG. 7, FIG. 7 is a schematic structural diagram of a power adapter assembly 700. The power adapter assembly 700 includes a power adapter 701 and a socket 702, where the power adapter 701 is the power adapter shown in any one of FIG. 4 or FIG. 5*a* to FIG. 5*d*; and the socket 702 is the socket shown in any one of FIG. 6*a* to FIG. 6*d*.

Figure 8:
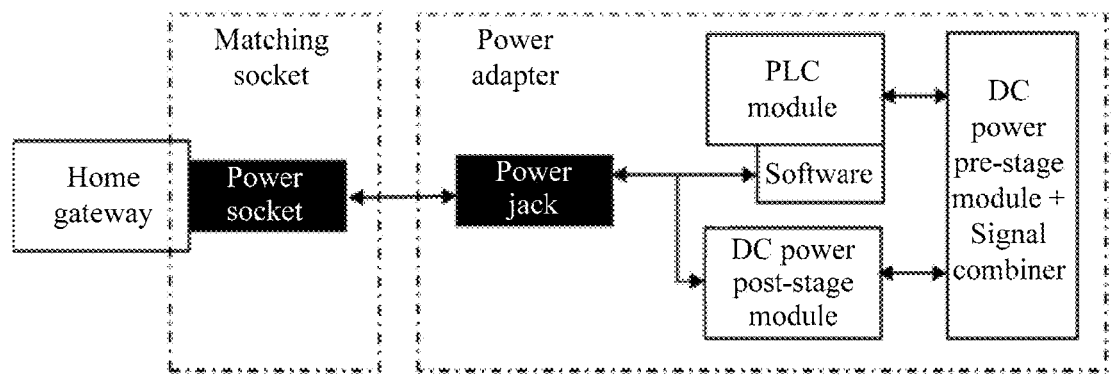
FIG. 8 is a schematic diagram of an application scenario of a power adapter assembly according to an embodiment of the present invention.

In actual application, as shown in FIG. 8, the power adapter and the socket are used together; the power adapter integrates dual functions of power supply and communication (that is, a DC power module is configured to supply power, and a PCL module is configured to perform communication); and the socket and the power adapter are connected for use, thereby effectively saving space resources for the power adapter and making the power adapter more intelligent. For example, a user can access a network directly by connecting the power adapter to a router, without a need to connect to the network by using a PLC terminal. For the user, the user can obtain efficient communication benefits without perception.

In the foregoing embodiments, the description of each embodiment has respective focuses. For a part that is not described in detail in an embodiment, reference may be made to related descriptions in other embodiments.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, multiple units or components may be combined or may be integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The power adapter, the socket, and the assembly provided in the present invention are described in detail above. The principle and implementation of the present invention are described herein through specific examples. The descriptions about the embodiments of the present invention are merely provided to help understand the method and core ideas of the present invention. In addition, a person of ordinary skill in the art can make variations and modifications to the present invention in terms of the specific implementations and application scopes according to the ideas of the present invention. Therefore, the content of specification shall not be construed as a limitation to the present invention.

What is claimed is:

1. A power adapter, wherein one end of the power adapter is configured to connect to a power supply apparatus, and the other end of the power adapter is configured to connect to a network terminal device; and, wherein the power adapter comprises:
    a power module, a communication module, and a connection module, wherein
    the power module is connected to both the communication module and the connection module, and is configured to obtain electric energy from the power supply apparatus, and supply power to the communication module, the connection module, and network terminal device;
    the communication module is connected to the connection module, and is configured to communicate with the network terminal device by using the connection module; and
    the connection module is configured to be connect-able to the network terminal device, and to transmit a signal between the communication module and the network terminal device.

2. The power adapter according to claim 1, wherein
    the communication module is further configured to run a software control program for assisting the communication module in communicating with the network terminal device.

3. The power adapter according to claim 1, wherein the connection module comprises a first terminal group, a second terminal group, and a third terminal, wherein
    the first terminal group is configured to
    connect to a first jack group in the network terminal device, and transmit, to the network terminal device, a first signal sent by the communication module, the first terminal group comprising at least one first terminal;
    the second terminal group is configured to connect to a second jack group in the network terminal device, and transmit, to the communication module, a second signal sent by the network terminal device, the second terminal group comprising at least one second terminal; and
    the third terminal is configured to connect to a third jack in the network terminal device, and transmit the electric energy of the power module to the network terminal device.

4. The power adapter according to claim 1, wherein the connection module comprises:
    a fourth terminal group and a fifth terminal, wherein
    the fourth terminal group is configured to
    connect to a fourth jack group in the network terminal device, and perform at least one of:
        transmitting, to the network terminal device, a first signal sent by the communication module; or
        transmitting, to the communication module, a second signal sent by the network terminal device, and the fourth terminal group comprises at least one fourth terminal; and
    the fifth terminal is configured to connect to a fifth jack in the network terminal device, and transmit the electric energy of the power module to the network terminal device.

5. The power adapter according to claim 1, wherein the connection module comprises:
    a sixth terminal, wherein
    the sixth terminal is configured to connect to a sixth jack in the network terminal device, and perform at least one of:
        transmitting, to the network terminal device, a first signal sent by the communication module; or
        transmitting, to the communication module, a second signal sent by the network terminal device; and
    the sixth terminal is further configured to transmit the electric energy of the power module to the network terminal device.

6. The power adapter according to claim 3, wherein the first terminal, the second terminal, and the third terminal are pin-shaped, sheet-like, or pillar-shaped.

7. The power adapter according to claim 4, wherein the fourth terminal and the fifth terminal are pin-shaped, sheet-like, or pillar-shaped.

8. The power adapter according to claim 5, wherein the sixth terminal is pin-shaped, sheet-like, or pillar-shaped.

9. A power adapter assembly, comprising:
a power adapter and a socket,
wherein one end of the power adapter is configured to connect to a power supply apparatus, and the other end of the power adapter is configured to connect to a network terminal device; and the power adapter comprises:
a power module, a communication module, and a connection module, wherein
the power module is connected to both the communication module and the connection module, and is configured to obtain electric energy from the power supply apparatus, supply power to the communication module and the connection module, and the network terminal device;
the communication module is connected to the connection module, and is configured to communicate with the network terminal device by using the connection module; and
the connection module is configured to be connect-able to the network terminal device, and to transmit a signal between the communication module and the network terminal device.

10. The assembly according to claim 9, wherein the connection module comprises a first terminal group, a second terminal group, and a third terminal, wherein
the first terminal group is configured to connect to a first jack group in the network terminal device, and transmit, to the network terminal device, a first signal sent by the communication module, the first terminal group comprising at least one first terminal;
the second terminal group is configured to connect to a second jack group in the network terminal device, and transmit, to the communication module, a second signal sent by the network terminal device, the second terminal group comprising at least one second terminal; and
the third terminal is configured to connect to a third jack in the network terminal device, and transmit the electric energy of the power module to the network terminal device.

11. The assembly according to claim 9, wherein the connection module comprises:
a fourth terminal group and a fifth terminal, wherein
the fourth terminal group is configured to connect to a fourth jack group in the network terminal device, and transmit, to the network terminal device, a first signal sent by the communication module and/or transmit, to the communication module, a second signal sent by the network terminal device, and the fourth terminal group comprises at least one fourth terminal; and
the fifth terminal is configured to connect to a fifth jack in the network terminal device, and transmit the electric energy of the power module to the network terminal device.

12. The assembly according to claim 9, wherein the connection module comprises:
a sixth terminal, wherein
the sixth terminal is configured to connect to a sixth jack in the network terminal device, and transmit, to the network terminal device, a first signal sent by the communication module and/or transmit, to the communication module, a second signal sent by the network terminal device; and
the sixth terminal is further configured to transmit the electric energy of the power module to the network terminal device.

13. The assembly according to claim 9, wherein the socket is applied to the network terminal device, the power adapter comprises a power module, a communication module, and a connection module, and the power adapter is configured to connect to the network terminal device; and the socket comprises a first jack group, a second jack group, and a third jack, wherein
the first jack group is configured to connect to a first terminal group in the connection module, and transmit, to the network terminal device, a first signal sent by the communication module, and the first jack group comprises at least one first jack; the second jack group is configured to connect to a second terminal group in the connection module, and transmit, to the communication module, a second signal sent by the network terminal device, and the second jack group comprises at least one second jack; and the third jack is configured to connect to a third terminal in the connection module, and transmit electric energy of the power module to the network terminal device.

14. The assembly according to claim 9, wherein the socket is applied to the network terminal device, the power adapter comprises a power module, a communication module, and a connection module, and the power adapter is configured to connect to the network terminal device; and the socket comprises a fourth jack group and a fifth jack, wherein
the fourth jack group is configured to connect to a fourth terminal group in the connection module, and transmit, to the network terminal device, a first signal sent by the communication module and/or transmit, to the communication module, a second signal sent by the network terminal device, and the fourth jack group comprises at least one fourth jack; and the fifth jack is configured to connect to a fifth terminal in the connection module, and transmit electric energy of the power module to the network terminal device.

15. The assembly according to claim 9, wherein the socket is applied to the network terminal device, the power adapter comprises a power module, a communication module, and a connection module, and the power adapter is configured to connect to the network terminal device; and the socket comprises a sixth jack, wherein
the sixth jack is configured to connect to a sixth terminal in the connection module, and transmit, to the network terminal device, a first signal sent by the communication module and/or transmit, to the communication module, a second signal sent by the network terminal device; and the sixth jack is further configured to transmit electric energy of the power module to the network terminal device.

* * * * *